July 5, 1949.

W. N. DUNN 2,475,085

POWER TRANSMISSION MECHANISM

Filed June 26, 1946

INVENTOR.
William N. Dunn.
BY

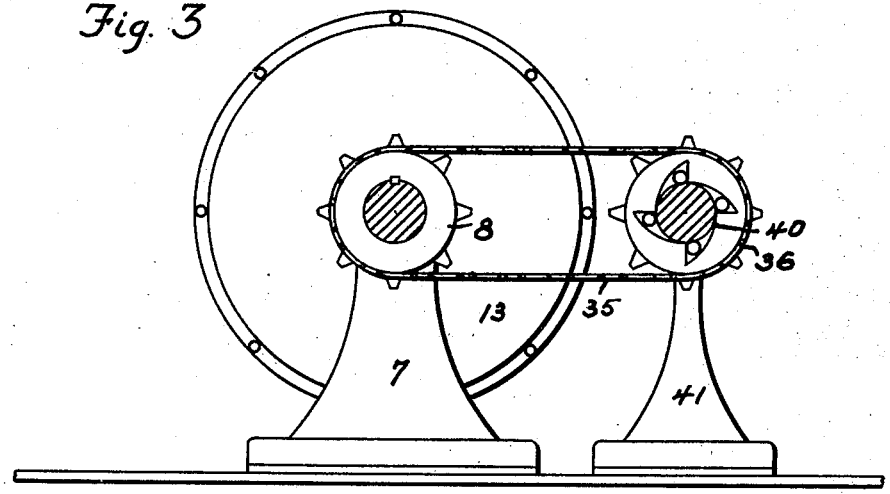
Fig. 3
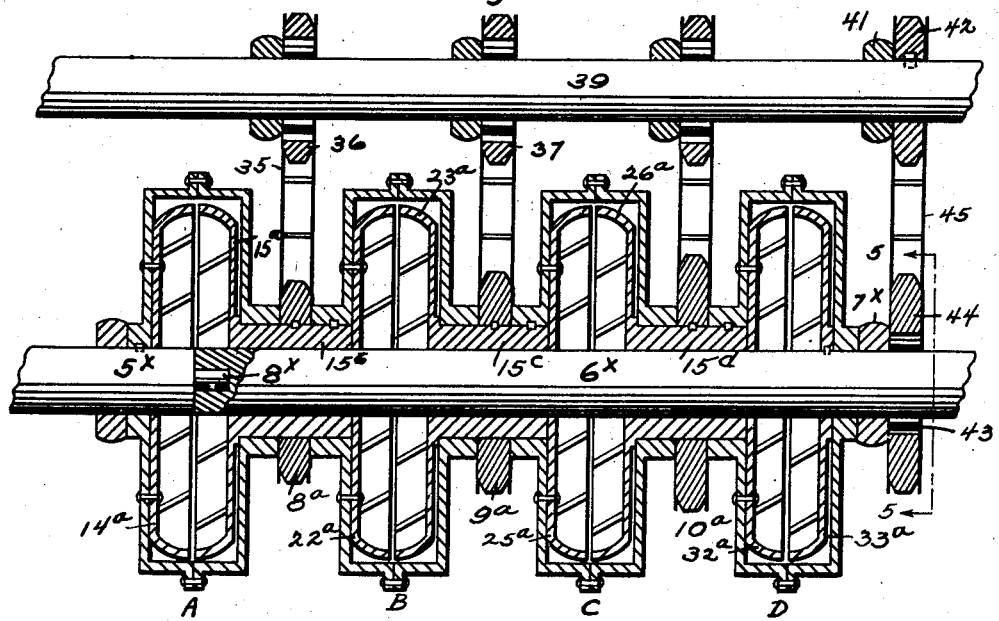
Fig. 4
Fig. 5
INVENTOR.
William N. Dunn.
BY

Patented July 5, 1949

2,475,085

UNITED STATES PATENT OFFICE 2,475,085

POWER TRANSMISSION MECHANISM

William N. Dunn, Martinsburg, W. Va.

Application June 26, 1946, Serial No. 679,460

6 Claims. (Cl. 74—665)

The invention relates to an automatic power transmission device having for its principal object the provision of a simple, economical and highly efficient mechanism which will automatically change the speed ratio between a driving and a driven element from an infinitely low gear to a direct drive ratio without requiring either manual or automatic gear shifting.

While the device of the invention is especially useful as a transmission mechanism for automobiles it is by no means limited to that field but may be usefully employed in any relation where the inertia of a driven part is to be overcome and said part is to be brought up to a desired speed gently and without shock, jar or undue strain upon the mechanism.

Briefly stated, the invention resides in providing a novel and efficient fluid drive power transmission device wherein a plurality of fluid clutches is provided, each driving through gearing of different ratio to a driven member, said clutches successively coming into action to increase the speed ratio as the torque decreases with pick up of speed of the driven element.

The device of the present invention is similar to that of my co-pending application, Serial No. 669,957, filed May 15, 1946, now abandoned in that it employs a plurality of fluid clutches which successively take up the driving action as the driven torque decreases with the overcoming of the inertia of the load.

The forms illustrated in the accompanying drawings differ from the parent application aforesaid in that in the parent application the several clutches take hold successively according to the load and when in high the last clutch, that is the one closest to the driven shaft, is pulling the load independently of the others, which are idling. In the new forms of the invention constituting the subject matter of this application there is only one clutch slipping at any one time until full load can be carried by direct power from the motor independently of the intermediate ratio chains or gear trains. But when full load is being taken care of regardless of speed, all of the clutches are under torque. If the load is so great as to cause the fourth clutch to slip, then all three in advance thereof are still under torque, and so on, back to low speed. The manner in which this is accomplished will be best understood by reference to the accompanying drawings, wherein:

Figure 3 is a vertical sectional view upon line 3—3 of Figure 2;

Figure 4 is a horizontal sectional view illustrating a modified form of the invention; and Figure 5 is a detailed sectional view upon line 5—5 of Figure 4.

Like numerals designate corresponding parts through all the figures of the drawings.

Figure 1:
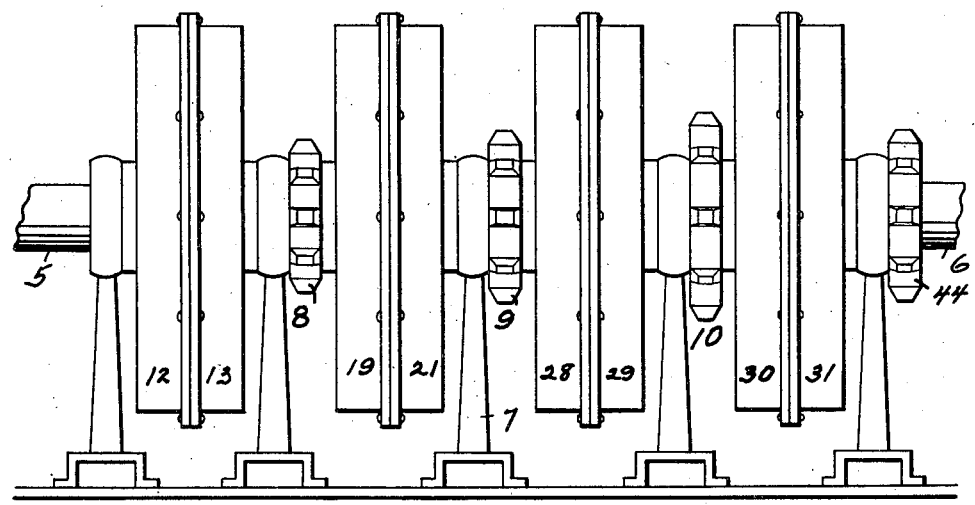
Figure 1 is a front elevation of a transmission mechanism constructed in accordance with the invention.
Figure 2:
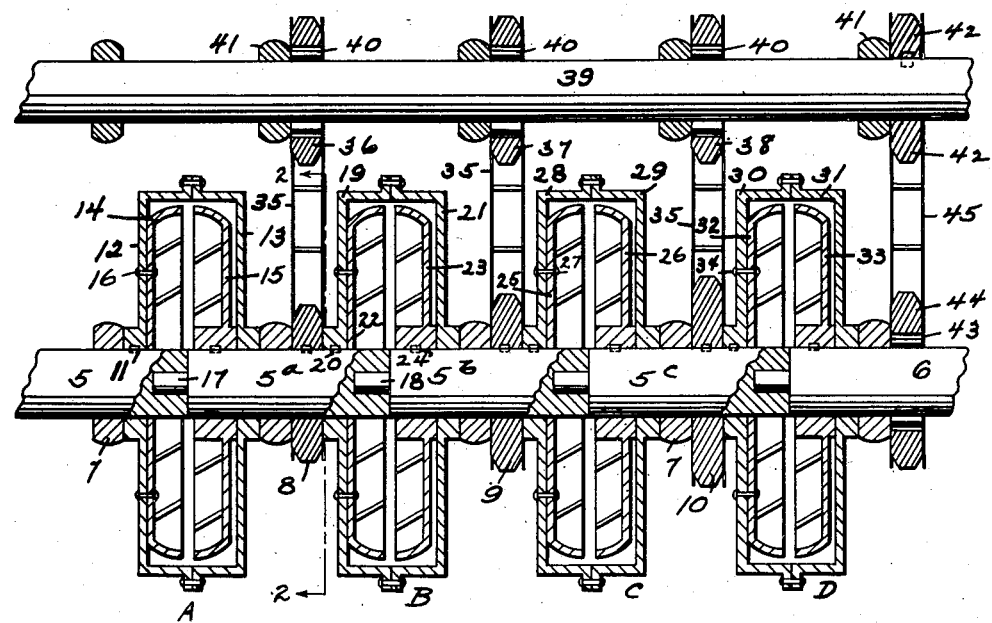
Figure 2 is a horizontal section.

Referring now to the form of the invention illustrated in Figures 1 to 3, the numeral 5 designates a driving shaft and 6 a driven shaft to which power is to be transmitted from shaft 5.

The driving shaft assembly comprises a plurality of independently rotatable shaft sections 5a, 5b, and 5c, the various shafts being suitably supported in bearings 7. Sprocket wheels 8, 9 and 10 of successively increasing diameter are keyed to the shaft sections 5a, 5b, and 5c, respectively. The shaft 5 has keyed thereto at 11 the housing half 12, the other half 13 of said housing bearing upon the shaft 5a which is freely rotatable with respect to said housing. The housing A composed of the halves 12 and 13 incloses the driving shell 14 and the driven shell 15 of the low speed fluid clutch. The shell 14 is fixed to the housing half 12 at 16. The casing A, being filled with oil, or other fluid, rotation of shell 14 tends to turn shell 15 in the same direction. Shell 15 is keyed or otherwise secured to the shaft section 5a. The shaft section is mounted in one of the bearings 7 and has end bearing engagement with shafts 5 and 5b, at 17 and 18. The rotation of shaft 5a is transmitted to the housing half 19 of the second speed clutch, through the key or other connection 20. The other half 21 of this second speed housing B has its bearing upon the shaft 5b in the manner previously described, the second speed fluid clutch consisting of the driving shell 22 and the driven shell 23, being keyed or otherwise secured at 24 to shaft 5b which carries the second speed sprocket 9.

The third speed housing C comprises the driving shell 25 and the driven shell 26. Shell 25 is affixed to the housing half 28 at 27, said housing half being keyed to and receiving its motion from shaft 5b. The other half 29 of the housing is supported upon the shaft 5c which carries the third speed sprocket wheel 10.

The fourth speed housing D comprises the halves 30 and 31, which house the driving shell 32 and the driven shell 33 of the fourth speed fluid clutch. The housing half 30 is keyed to shaft 5c and has the driven shell 32 secured thereto at 34. The other half 31, of the housing, bears upon shaft 6 but said shaft is free to rotate with respect thereto. The driven shell 33 is keyed to driven shaft 6.

The several sprocket wheels 8, 9 and 10 are connected by sprocket chains 35 with sprocket wheels 36, 37 and 38 upon a counter shaft 39, the size of the respective sprocket wheels varying in such manner as to give the desired gear ratio. These sprocket wheels, 36, 37 and 38 drive the counter shaft 39 through overrunning clutches 40 of the conventional and well-known type, so arranged that as the resistance torque of shaft 6 decreases as the inertia of the load is overcome, a gear of the next higher ratio will come into action. The counter shaft 39 which is supported in bearings 41, carries a sprocket wheel 42 which imparts the motion of the counter shaft 39 to the driven shaft 6 through overrunning clutch 43, sprocket 44 and a connecting sprocket chain 45. This clutch permits shaft 6 to move independently of the counter shaft whenever the torque thereon decreases to such a point that the drive may take place directly through the line of clutches and independently of counter shaft 39. At this time the drive will be through the following elements: 5, 14, 15, 5a, 22, 23, 5b, 25, 26, 5c, 32 and 33 to shaft 6. The mechanism is then in direct drive and remains so as long as the torque upon the driven shaft is sufficiently low. Upon increase of this torque to such a point that slippage of the clutch in housing D takes place, the drive will drop back to the third speed sprocket 10 and its associated parts. This drop back may continue back to low speed or any point inbetween according to the degree of torque upon the shaft 6.

The form of the invention illustrated in Figure 4 is very similar to that heretofore described, and the operation is substantially the same. In this case the driving shaft is indicated at 5x and the driven shaft 6x is continuous. The shaft 6x is supported in bearing 7x and by an end bearing on shaft 5x at 8x. In this form of the invention the driven shells 15a, 23a and 26a carry sleeves 15b, 15c, and 15d, said sleeves being rotatably mounted upon the shaft 6x and having the sprockets 8a, 9a and 10a keyed thereto.

The driving shell 14a of clutch A is keyed to shaft 5x and the driving shells 22a, 25a, and 32a of clutches B, C, and D are keyed to the said sleeves 15b, 15c and 15d, respectively, and thus the driven shell of one clutch imparts motion to the housing and driving shell of the clutch of next higher speed. The driven shell 33a of the high speed clutch D is keyed directly to the shaft 6x. The sprocket wheels 8a, 9a, and 10a drive to the counter shaft 39 in the manner previously described and the clutch 43 acts the same in this case as in the form illustrated in Figure 2. The term "shaft assembly" as employed in the claims is to be generically construed to include either the driving shaft 5x and main driven shaft 6x of Fig. 4 or the multiple section shaft assembly of Fig. 2, since in Fig. 4 the additional sleeves 15b, 15c, 15d for which shaft 6x constitutes a support, causes the two structures i. e. Figs. 2 and 4 to function in substantially the same way. In Fig. 2 the elements 5, 5a, 5b, 5c and 6 constitute a main drive shaft assembly while in Fig. 4 the elements 5x and 6x constitute such main drive shaft assembly. In each case such assembly includes a driving and a driven part and in each case such assembly supports a plurality of fluid clutches for which such main shaft constitutes the axis and support.

By virtue of the arrangement shown friction incident to rotation of idling clutches is reduced to a minimum. The arrangement described is one of simplicity and economy. It is to be noted that there are four of the fluid clutches A, B, C and D. I may employ only three of these clutches by sacrificing one of the intermediate speeds. However, it is important to have at least three of them where the first is a low speed clutch operative from standing position to low speed forward, since if only two clutches were employed and with a first a low speed clutch, the next shift would be directly into "high" with no intermediate speed. While for clarity I refer to the different speeds it should be understood that the automatic control or automatic gear shifting is the result of power and load only. For example; on a smooth, level road all four clutches may be under torque and driving direct, independently of the gear trains, with the automobile running only 20 miles per hour. The same can occur at 50 miles per hour under light load, as upon a slight down grade, without breaking or unbreaking the torque within any of or between any of the clutches.

It is to be understood that the invention is not limited to the precise construction set forth but that it includes within its purview whatever changes fairly come within either the terms or the spirit of the appended claims.

Having described my invention, what I claim is:

1. In an automobile power transmission mechanism the combination with a driving shaft of a driven shaft, a plurality of separate fluid clutches exceeding two in number, a plurality of change speed gearings of varying ratios, one of said gearings being associated with each of the respective clutches, means for driving the driven shaft from the driving shaft for all speeds, including a start from standing to low speed, successively, through the several fluid clutches and their associated change speed gearings and means for driving said driven shaft from the driving shaft under the simultaneous action of all of the said fluid clutches and independently of the change speed gearings.

2. In a power transmission mechanism, the combination with a driving shaft assembly, of a driven shaft, said driving shaft assembly comprising a driving shaft proper and a plurality of independently rotatable shaft sections in longitudinal alignment therewith and in longitudinal alignment with the driven shaft, a plurality of fluid clutch housings, one of which is secured to the main driving shaft and the others of which are secured to the independently rotatable shaft sections, driving and driven fluid clutch shells in said housings, the driving shells turning with said housings, and with the shaft sections to which said housings are secured and the driven shells of the corresponding clutches being secured to the independently rotatable shaft sections, adjacent the shaft sections to which the driving shells are secured and in the direction toward the driven shaft, that one of the driven shells representing the highest speed clutch of the assembly being secured to the driven shaft, a counter shaft, means for driving from the counter shaft to the driven shaft through an overrunning clutch and means for driving from each of the independently rotatable shaft sections to said counter shaft through overrunning clutches and through gearing of a different ratio for each of the independently rotatable shaft sections.

3. A structure as recited in claim 2 wherein the independently rotatable shaft sections have end bearing engagement with each other and wherein one of said shaft sections has end bearing engagement with the driving shaft and another of said shaft sections has end bearing engagement with the driven shaft.

4. A structure of the character described comprising a main driving shaft, a plurality of independently rotatable shaft sections aligned with the main driving shaft, a driven shaft likewise aligned with the independently rotatable shaft sections, a plurality of fluid clutch housings, one of said housings being secured at one side to the main driving shaft and the other of said housings being secured at one of their sides to the independently rotatable shaft sections, the other sides of said housings embracing but being free to rotate with respect to the next adjacent shaft sections in the direction toward the driven shaft, fluid clutch shells in said housings each comprising a driving and a driven shell, the driving shells being carried by that portion of the housing which is affixed to the shaft section, the driven shells being affixed to the shaft sections next adjacent in a direction toward the driven shaft, that housing which incloses the highest speed clutch of the assembly and which is the housing lying nearest the driven shaft, bearing freely upon the driven shaft, and the driven shell within said last named housing being secured to the driven shaft, a sprocket wheel secured to each of the independently rotatable shaft sections, outside of the associated clutch housing said sprocket wheels being of successively increasing size in a direction toward the driven shaft, a counter shaft, sprockets upon the counter shaft and means for driving from the sprocket wheels of the independently rotatable shaft sections to the counter shaft, through overrunning clutches of which the sprockets of the counter shaft constitute a part, and means for driving from the counter shaft to the driven shaft through a clutch operative whenever the speed of the counter shaft is greater than that of the driven shaft.

5. A power transmission mechanism of the character described, comprising a driving shaft and a driven shaft, said shafts being in longitudinal alignment with each other, a plurality of fluid clutch housings, fluid clutches in each of said housings, each comprising a driving and a driven shell, each of said driven shells except the last being carried by a sleeve that is rotatable upon the driven shaft, a change speed gearing element upon each of said sleeves, a driven shell of the last clutch being affixed to the driven shaft, means for securing the housing and the driving shell of the first clutch to the driving shaft, at one side of said housing, the other side of said housing having a free bearing upon the sleeve of the driven shell of said first clutch, means for securing the advance sides of the housings of the succeeding clutches to said sleeves of the driven shells of the clutches in advance thereof, and means for securing the driven shell of the last clutch to the driven shaft, a counter shaft, means for driving from the gear elements of the sleeves to said counter shaft, through overrunning clutches, and means for driving from the counter shaft to the driven shaft through an overrunning clutch as described.

6. In an automobile power transmission mechanism, the combination with a shaft assembly of a plurality of fluid clutches more than two in number operatively connected together and disposed along and supported upon said shaft assembly, each of said clutches comprising an oil tight housing with a driving and a driven shell therein, said shaft assembly including at one end a driving member and at the other end a driven member, means for connecting the driving shell of the clutch nearest to the said driving member of the shaft assembly to said member, and means for connecting the driven shell of the clutch farthest from the last named clutch to the driven member of the shaft assembly, a counter shaft common to all of the clutches, gearings of varying ratios between said counter shaft and the several driven shells, each of which gearings includes an overrunning clutch, additional gearing between the countershaft and the driven member of the shaft assembly also including an overrunning clutch, the first named gearings comprising driving elements and driven members, the latter being upon the countershaft and means for connecting said driving elements to the driven shells of the associated fluid clutches and thus through all the fluid clutches which lie between any given one of said last named driving elements and the driving member of the shaft assembly, back to said driving member of the shaft assembly.

WILLIAM N. DUNN.

REFERENCES CITED

The following references are of record in the file of this patent:

UNITED STATES PATENTS

| Number | Name | Date |
|---|---|---|
| 2,055,895 | Fawcett | Sept. 29, 1936 |
| 2,150,150 | Burrows | Mar. 14, 1939 |
| 2,189,537 | Swennes | Feb. 6, 1940 |
| 2,297,259 | Speiser | Sept. 29, 1942 |
| 2,368,711 | Jandasek | Feb. 6, 1945 |

FOREIGN PATENTS

| Number | Country | Date |
|---|---|---|
| 366,358 | Italy | Dec. 24, 1938 |